United States Patent [19]

Azarov et al.

[11] 4,165,273
[45] Aug. 21, 1979

[54] DEVICE FOR PRODUCING DEEPLY DESALTED WATER

[76] Inventors: Nikolai N. Azarov, Leninsky prospekt, 108, kv. 26; Georgy A. Zelensky, Pionerskaya ulitsa, 29, kv. 2; Igor V. Borisovsky, Leninsky prospekt, 153, kv. 49, all of Voronezh, U.S.S.R.

[21] Appl. No.: 864,141

[22] Filed: Dec. 20, 1977

[51] Int. Cl.² .............................................. B01D 13/02
[52] U.S. Cl. .................................. 204/301; 204/180 P; 204/180 B; 210/243; 210/266; 210/321 R
[58] Field of Search ............ 204/180 B, 180 P, 299 R, 204/301; 210/243, 266, 321 R

[56] References Cited

U.S. PATENT DOCUMENTS

| | | | |
|---|---|---|---|
| 2,763,607 | 9/1956 | Staverman | 204/180 B |
| 2,980,598 | 4/1961 | Stoddard | 204/180 B |
| 3,006,828 | 10/1961 | Gaysowski | 204/180 B |
| 3,074,864 | 1/1963 | Gaysowski | 204/180 B |
| 3,645,884 | 2/1972 | Gilliland | 204/180 B |
| 3,989,613 | 11/1976 | Gritzner | 204/180 P |

*Primary Examiner*—Charles N. Hart
*Assistant Examiner*—Ivars Cintins
*Attorney, Agent, or Firm*—Steinberg and Blake

[57] ABSTRACT

A device is proposed for producing deeply desalted water. The device comprises a dielectric housing in which cooled electrodes and ion-exchange membranes are located. The electrodes are rods located parallel with respect to one another in vertexes of at least one regular hexagon with alternating polarity. Each membrane is made in the form of a tube and located concentrically to the corresponding electrode, the polarity of the membrane and of the electrode being the same. The device comprises desalinization chambers for sorption of the salt ions from the water being treated, said chambers being filled with ion-exchange resins. The desalinization chambers are formed by the membranes, located between them, and connected with each other. The device also contains brine chambers for removing the salt ions with the water being passed through the chambers. Each brine chamber is defined by one of the corresponding membranes.

The proposed device is small in size, highly efficient, reliable and safe in operation.

2 Claims, 2 Drawing Figures

DEVICE FOR PRODUCING DEEPLY DESALTED WATER

The present invention relates to devices for purifying liquids and more particularly to a device for producing deeply desalted water.

The device made according to the present invention can be most effectively used for producing desalted water required for manufacturing articles used in electronics.

The invention can also be used in chemical, pharmaceutical, medical, food and other industries.

Known in the art is a device for producing deeply desalted water, which has a housing made from a dielectric material. Flat metal electrodes, electrically connected with a constant current source, are mounted along the faces of the housing.

Inside the housing flat ion-exchange membranes are located parallel to the electrodes in such a way that cationite membranes are alternated with anionite ones. All the membranes are separated with rubber gaskets arranged along the perimeter of the membranes.

Each membrane together with the neighboring membrane of the opposite polarity located on one side thereof forms a brine chamber and with a membrane located on the other side thereof, a desalinization chamber.

The desalinization chambers are filled with ion-exchange (cationite and anionite) resins and are intended for sorption of the salt ions from the water being treated.

The brine chambers are intended for removing salt ions with the water being passed therethrough.

The housing has an inlet for the water being treated and an outlet for purified water. There are also inlet and outlet for water cooling the electrodes and washing the brine chambers from which water saturated with salt ions is removed.

During the operation of the device, the water being treated is fed through a mixture of ion-exchange resins which are located in the desalinization chambers. The ions of the salts present in the water are sorbed on the corresponding resins: cations on the cationite and anions on the anionite. As a result, the process of water purification from the salts is performed. The process continues until the ion-exchange resins begin to be saturated with the ions of the salts extracted from the water as is indicated by an instrument measuring the specific electric conductivity of water. After attaining a definite, critical point of saturation, current is passed for regeneration of the ion-exchange resins. Under the action of the current, the salt ions deposited on the resin mixture start migrating to the opposite polarity electrodes. On their way they encounter semipermeable ion-exchange membranes, exchange their ions, and enter the brine chambers where they are removed by flowthrough water (see, for example, Inventor's Certificate of the USSR No. 323,958).

The known device is disadvantageous in that it is not efficient enough due to a large distance between the electrodes, which increases considerably the electric resistance of the resin mixture and materially hinders the electrochemical process in the device.

The efficiency of the known device can be increased by increasing the number of the chambers which, in its turn, increases the distance between the electrodes and materially, the size of the device.

The known device is also disadvantageous in that it is hazardous for the attending personnel, since the flat faces of the ion-exchange membranes which are under voltage extend to the outer surface of the housing.

It is the main object of the invention to provide a device for producing deeply desalted water, in which electrodes and ion-exchange membranes will be made and located with respect to one another in such a manner as to increase considerably the efficiency of the device and decrease its size.

Another equally important object of the present invention is to provide a device for producing deeply desalted water, in which electrodes and ion-exchange membranes will be made and located in such a manner as to increase its electrical safety. Said objects are accomplished by providing a device for producing deeply desalted water, comprising a dielectric housing provided with inlets and outlets for water and accommodating cooled electrodes, located parallel with respect to one another, and ion-exchange membranes, forming desalinization chambers for sorption of salt ions from the water being treated and filled with ion-exchange resins and brine chambers for removing salt ions with the water being passed through the chambers, according to the invention, said electrodes are rods located parallel with respect to one another in the vertexes of at least one regular hexagon with alterating polarity, and each membrane is made in the form of a tube, located concentrically to the corresponding electrode and has the same polarity as the electrode, each brine chamber being defined by a corresponding membrane and desalinization chambers formed by the membranes being connected with one another.

It is expedient to locate the adjacent electrodes in the vertexes of congruent hexagons so that the electrodes should constitute common faces of the adjacent imaginary hexagonal prisms.

Such device is more efficient due to a decrease in the electric resistance and, hence, in the current density per area unit in the intertube space.

A rather high efficiency, practically of any magnitude, can be attained in the herein-proposed device by increasing the number of hexagons with a small increase in the device size. The constant and minimum distance between the electrodes inside the hexagons makes possible uniform distribution of the current density per unit surface area of the ion-exchange membranes, which has a substantial influence on the efficiency of the device.

Such an arrangement of the electrodes and membranes makes it possible to accommodate a greater quantity of resins in the device and to obtain a larger amount of treated water.

The proposed device features sufficient electrical safety in operation, due to the possibility of considerably decreasing the voltage and to the fact that tubular ion-exchange membranes do not extend beyond the dielectric housing.

The device made according to the invention is small in size and convenient in operation.

A specific example of realizing the present invention with reference to the accompanying drawings is given hereinbelow by way of illustration:

Figure 2:
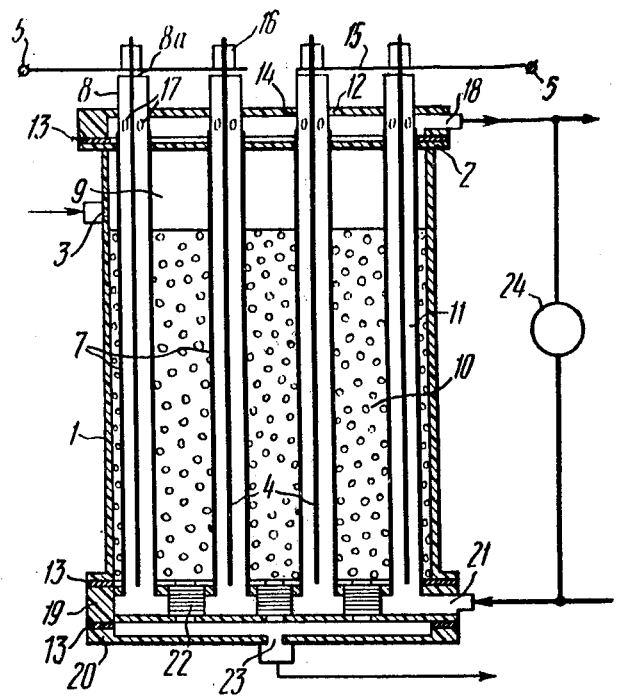
FIG. 2 is a section taken along the line II—II in FIG. 1.

The device for producing deeply desalted water, according to the present invention, has a housing 1 (FIG. 1) made of a dielectric material in the form of a tube with a round cross-section, the top end of the device being closed by a partition 2 (FIG. 2).

In the housing 1 an inlet opening 3 is provided for the water being treated. Electrodes 4 in the form of rods are mounted vertically in the housing 1 parallel with respect to one another, said electrodes being connected with a constant current source 5.

The electrodes 4 have opposite polarity and are located in the vertexes of regular and congruent hexagons with electrodes in adjacent vertexes having alterating polarity so that the electrodes 4 are common faces of adjacent imaginary hexagonal prisms. The face planes of the prisms will be further referred to as electroionite cells 6 (FIG. 1).

Figure 1:
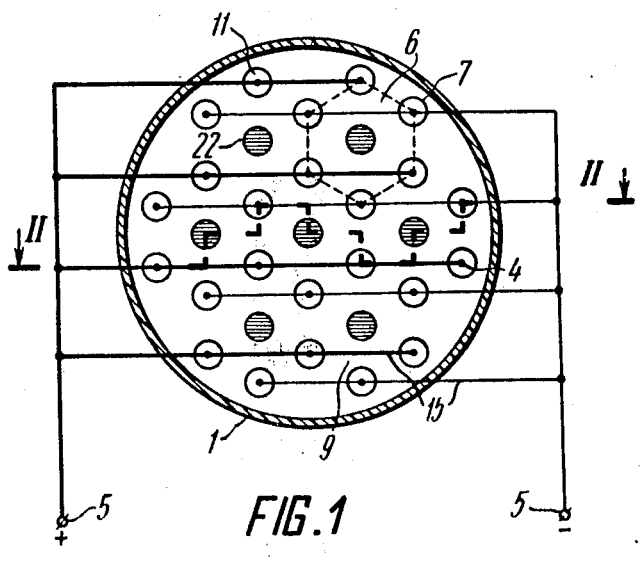
FIG. 1 is a diagrammatic plan view of the device for producing deeply desalted water, top cover, partition and resins being not shown.

One electroionite cell 6 is conventionally shown in FIG. 1 with dotted lines.

The housing 1 comprises ion-exchange, i.e. cationite and anionite membranes 7 in the form of tubes. The membranes 7 are arranged concentrically to the corresponding electrodes 4 of the same polarity. The membranes 7 in the described example are made of a film on the basis of ion-exchange resins and are set on perforated tubes 8 (FIG. 2) which impart rigidity to said membranes 7.

The membranes 7 form desalinization chambers 9 located between the tubes and connected with one another. The desalinization chambers 9, intended for sorption of salt ions from the water being treated which passes through them, are filled with ion-exchange resins 10, said resins being placed in the housing 1 approximately up to the level of the inlet opening 3.

Brine chambers 11 serve for removing the salt ions with the water passing therethrough. Each brine chamber 11 is defined by a corresponding membrane 7.

The brine chambers 11 are also intended for cooling the electrodes 4 with water passing through them.

To the upper part of the housing 1, a cover 12 is fitted, an annular rubber gasket 13 being placed between said cover and partition 2.

In the cover 12 holes 14 are made for bringing out from the housing 1 dead non-perforated ends 8a of the tubes 8 and electrodes 4 locked in such ends of the tubes 8. Bars 15 are rigidly connected with the help of nuts 16 to the electrodes 4 extending from the tubes 8.

Bars 15 are intended for connection of the electrodes 4 with the constant current source 5.

In the upper part of the tubes 8 holes 17 are made for removing water which entrains salt ions separated from the water being treated. A hole 18 is also made in the cover 12, said hole being connected with the brine chambers 11 and serving for removing water from the cavity under the cover 12.

The electrodes 4 and tubes 8 with the membranes 7 extend beyond the lower edge of the housing 1.

An intermediate housing 19 is fitted to the open lower part of the housing 1, an annular rubber gasket 13 being placed between the housing 1 and the housing 19.

A lower cover 20 is fitted to the intermediate housing 19 also through a rubber gasket 13.

In the intermediate housing 19 a hole 21 is made for introducing water intended for washing the brine chambers 11 and removing salt ions from the water being treated.

Drainage tubes 22 (FIG. 1) are placed in the intermediate housing 19 through the center of each electroionite cell 6, the upper ends of said tubes being connected with the desalinization chambers 9 and lower ends, with the cavity over the lower cover 20 in which a hole 23 (FIG. 2) is made for removing the treated water from the device. The drainage tubes 22 let the purified water pass through them but impede the fractions of ion-exchange resins.

The device for producing deeply desalted water, made according to the invention, operates in the following way.

The water being treated is fed through the opening 3 into the chamber 9 and passes through a mixture of ion-exchange resins 10.

The salt ions present in the water migrate to the resins 10. The purified water passes through drainage tubes 22, enters the cavity over the cover 20, and goes through the outlet holes to the consumer.

Simultaneously with delivering the water for purification through the opening 3, water is introduced through the hole 21 into the cavity of the cover 19. Water enters into the lower ends of and passes through the brine chambers 11, exits from the upper ends of tubes 8 through the holes 17, and then, through the hole 18 goes to a pump 24 (FIG. 2) to be returned to the hole 21.

In the process of saturation, when a definite critical point of saturating the ion-exchange resins 10 with the salts is attained, current is switched on, which is brought along the bars 15 to the electrodes 4.

Under the action of the current, the salt ions, deposited on the resins 10, begin to migrate to the oppositely charged electrodes 4. The ion salts pass through the membranes 7 placed in the path of the ions and enter the water going through the chambers 11. The water becomes all the more saturated with salts to the state of a brine.

As a result, the process of water purification is effected and, simultaneously, the resins are regenerated.

The arrangement of the brine chambers 11 in cross-section in the vertexes of regular hexagons, in a honeycomb-like pattern, ensures the uniform and maximum complete regeneration of ion-exchange resins at minimum voltage.

Such a construction of the device makes it possible to increase its efficiency several times, the size of the device being increased only slightly as compared to the known device.

An experimental device for deep desalination of water has been put through comprehensive tests which confirmed its high efficiency with a relatively small size.

The device is safe in operation and convenient in service.

It is to be understood that various modifications may be made in the exemplary embodiment of the device by those skilled in the art without departing from the spirit and scope of the invention.

What is claimed is:

1. A device for producing deeply desalted water, comprising: a dielectric housing; an inlet for the water being treated located in said dielectric housing; an outlet for the water being treated, located in said dielectric housing; electrodes mounted in said dielectric housing adapted to be connected electrically with a current source, the electrodes being rods arranged in parallel substantially in the vertexes of a regular hexagon, adjacent electrodes in each hexagon having alternating polarity; ion-exchange members located in said dielectric housing and made in the form of tubes; each of said ion-exchange membranes concentrically surrounding and having the same polarity as a corresponding one of said electrodes; desalinization chambers defined by said ion-exchange membranes and by the walls of said dielectric housing communicating with one another; said chambers being substantially filled with ion-exchange resins intended for the sorption of salt ions from the water being treated; brine chambers each of which is defined by a corresponding membrane; said brine chambers being adapted to have water passed therethrough for removing salt ions; and a means for cooling said electrodes.

2. A device as claimed in claim 1, wherein said adjacent electrodes are located in the vertexes of regular hexagons in such a manner that said electrodes constitute common vertexes of adjacent congruent hexagons.

* * * * *